United States Patent [19]
Yamaguchi et al.

[11] Patent Number: 5,584,003
[45] Date of Patent: Dec. 10, 1996

[54] CONTROL SYSTEMS HAVING AN ADDRESS CONVERSION DEVICE FOR CONTROLLING A CACHE MEMORY AND A CACHE TAG MEMORY

[75] Inventors: Seiji Yamaguchi, Osaka; Toru Kakiage, Ashiya; Tomohiro Kurozumi; Shiro Yoshioka, both of Osaka; Koutarou Hirai, Kobe, all of Japan

[73] Assignee: Matsushita Electric Industrial Co., Ltd., Osaka, Japan

[21] Appl. No.: 575,265

[22] Filed: Dec. 20, 1995

Related U.S. Application Data

[63] Continuation of Ser. No. 208,205, Mar. 10, 1994, abandoned, which is a continuation of Ser. No. 677,547, Mar. 29, 1991, abandoned.

Foreign Application Priority Data

Mar. 29, 1990 [JP] Japan ........................... 2-82426

[51] Int. Cl.⁶ ..................................... G06F 12/00
[52] U.S. Cl. ..................... 395/403; 395/417; 395/445
[58] Field of Search ...................... 395/445, 455, 395/403, 417, 413, 415

[56] References Cited

U.S. PATENT DOCUMENTS

| | | |
|---|---|---|
| 3,761,881 | 9/1973 | Anderson et al. ................. 395/400 |
| 3,781,808 | 12/1973 | Ahearn et al. . |
| 4,400,774 | 8/1983 | Toy . |
| 4,550,368 | 10/1985 | Bechtolsheim . |
| 4,860,192 | 8/1989 | Sachs et al. . |
| 4,937,735 | 6/1990 | Uehara . |
| 4,943,914 | 7/1990 | Kubo ................................. 395/425 |
| 5,155,824 | 10/1992 | Edenfield et al. ................. 395/425 |
| 5,226,133 | 7/1993 | Taylor et al. ..................... 345/400 |

*Primary Examiner*—Rebecca L. Rudolph
*Attorney, Agent, or Firm*—Lowe, Price, LeBlanc & Becker

[57] ABSTRACT

A control system for controlling a cache tag memory has an address conversion device which includes an associative storage for storing logical addresses, a random access memory for storing physical addresses, and a hit-signal generating circuit for generating a hit signal, a word selecting signal and at least one control signal. The hit signal indicates that a hit has occurred between a logical address stored in the associative storage and an input logical address. The address conversion device controls the reading operation of a tag address stored in the cache tag memory by using the control signal generated by the hit-signal generating circuit in synchronization with a word selecting signal used in the reading operation of a physical address stored in the random access memory such that the physical address and the tag address are read at substantially the same time. Further, this address conversion device controls a reading operation of the data stored in the cache memory by reading the physical address and the tag address at substantially the same time and by using a second control signal generated by the hit-signal generating circuit in synchronization with the word selecting signal. Moreover, the address conversion device controls the reading of data from the cache memory and the production of a cache hit signal, which is generated when the physical address matches the logical address. Accordingly, a high-performance system is achieved.

7 Claims, 11 Drawing Sheets

2

CONTROL SYSTEMS HAVING AN ADDRESS CONVERSION DEVICE FOR CONTROLLING A CACHE MEMORY AND A CACHE TAG MEMORY

This application is a continuation of application Ser. No. 08/208,205 filed Mar. 10, 1994 now abandoned which application is a continuation of application Ser. No. 07/677,547 filed Mar. 29, 1991 now abandoned.

BACKGROUND OF THE INVENTION

1. Field of The Invention

This invention generally relates to a control system for controlling a cache memory and to a control system for controlling a cache tag memory. Further, this invention can be applied to a microprocessor having an address conversion device for translating logical addresses into physical addresses and a cache memory which is accessed by using physical addresses therein.

2. Description of The Related Art

Generally, the following measures are taken to realize a high-performance system:
(1) Improvement of performance of a microprocessor itself;
(2) Employment of parallel processing architecture;
(3) Employment of a multiprocessor architecture; and
(4) Provision of a large cache memory.

Especially, in case where the measures (3) and (4) are taken (namely, the multiprocessor architecture is employed and the large cache memory is provided), the system comes to be provided with a cache memory which is accessed by using physical addresses.

When a central processing unit (hereunder abbreviated as CPU) of the microprocessor accesses a cache memory by generating a logical address, it takes a period of time of one cycle in the address conversion device to translate the logical address to a physical address. Further, the cache memory is accessed by using the physical address generated in the address conversion device in the next one cycle and then the data is transferred to the CPU. In this case, it takes two or more cycles to obtain data or an instruction by accessing the cache memory after the CPU generates the logical address.

A high-performance microprocessor can be fully realized by effecting an access to the cache memory by using a physical address in one cycle. To this end, it is necessary to perform an access operation of the cache memory by using a physical address in parallel with an address conversion operation of translating a logical address to a physical address in one cycle. The present invention is created to resolve the above described problem.

It is accordingly an object of the present invention to provide control systems for controlling the cache memory and for controlling the cache tag memory, whereby an access operation of the cache memory by using a physical address can be performed in parallel with an address conversion operation of translating a logical address to a physical address in one cycle.

SUMMARY OF THE INVENTION

To achieve the foregoing object, in accordance with a first aspect of the present invention, there is provided a control system for controlling a cache tag memory. The control system having an address conversion device which includes at least an associative storage means for storing logical addresses therein, a random access memory means connected to the cache tag memory for storing physical addresses therein, and a hit-signal generating means connected to the associative storage means, the random access memory means and the cache tag memory for generating a hit signal indicating that a hit occurs in the address conversion device. The address conversion device controls an operation of reading a tag address (i.e., a cache tag) stored in the cache tag memory by using a control signal generated by the hit-signal generating means in synchronization with a word selecting signal used in an operation of reading a physical address stored from the random access memory means. Further, the reading of the physical address and that of reading the tag address are effected at substantially the same time.

Furthermore, in accordance with a second aspect of the present invention, there is provided a control system for controlling a cache memory. This control system also having an address conversion device which includes at least an associative storage means for storing logical addresses therein, a random access memory means connected to the cache tag memory for storing physical addresses therein. The hit-signal generating means generates a first control signal and a second control signal in synchronization with a word selecting signal used in an operation of reading a physical address stored from the random access memory means. The address conversion device controls an operation of reading a tag address stored in the cache tag memory and effects the reading of the physical address and the reading of the tag address at substantially the same time by using the first control signal. Moreover, the address conversion device controls an operation of reading data stored in the cache memory and effects the reading of the data stored in the cache memory and the production of a cache hit signal which is generated in case where the physical address is matched with the logical address at substantially the same time by using the second control signal.

Thereby, in case where hits occurs in both of the address conversion device and the cache tag memory (hence, the cache memory), it is possible that a logical address is converted into a physical address in one cycle, and subsequently the cache memory and the cache tag memory are accessed by using the physical address obtained by the address conversion, and then data stored in the cache memory is transferred to a central processing unit (CPU) and so forth. Consequently, high-performance of a microprocessor can be achieved.

Namely, in accordance with the present invention, access operations (i.e., read operations and write operations) of the cache memory and the cache tag memory, which are accessed by using the physical address, are controlled by using the control signal generated the address conversion device for translating the logical address, which is produced in the CPU, into the physical address. Thereby, it is realized that the production of the hit signal in the cache memory and the reading of the data are effected at a high speed. Consequently, the address conversion and the access operation of the cache memory can be performed in parallel with each other in one cycle. This means that the microprocessor can execute a memory access instruction (i.e., a load instruction and a store instruction) in one cycle. Therefore, the present invention can considerably improve the performance of the microprocessor.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Hereinafter, a preferred embodiment of the present invention will be described in detail by referring to the accompanying drawings.

Figure 1:
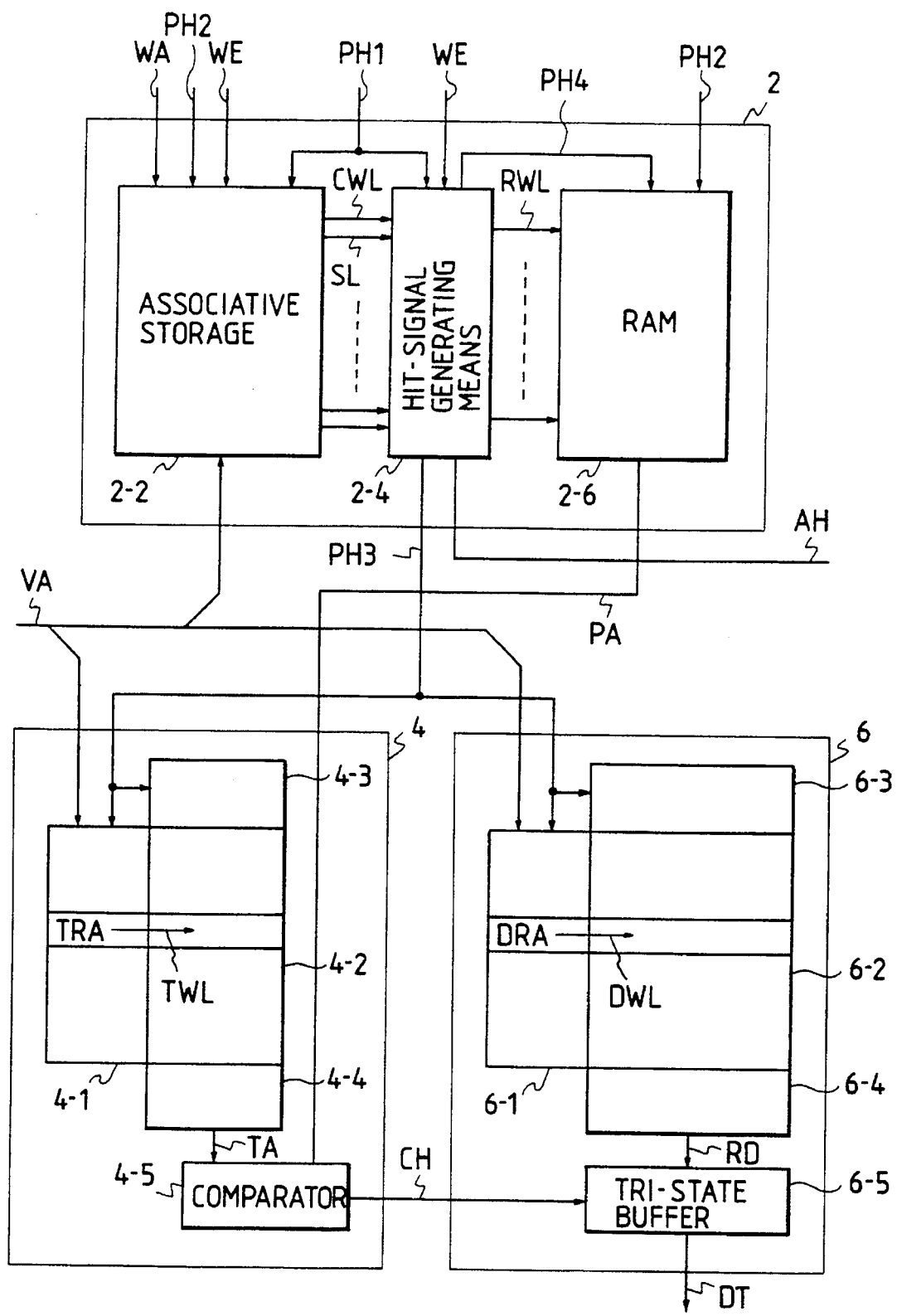
FIG. 1 is a schematic block diagram for showing the construction of a preferred embodiment of the present invention.

Referring first to FIG. 1, there is illustrated the construction of a preferred embodiment of the present invention. In FIG. 1, reference numeral 2 designates an address conversion device for translating logical addresses into physical addresses; 4 a cache tag memory for storing cache tags; and 6 a cache memory for storing (cache) data.

The address conversion device 2 which operates in synchronization with clock signals (hereinafter referred to simply as clocks) PH1 and PH2 has two tables, one of which stores logical addresses (hereunder referred to as a logical address table) and the other of which stores physical addresses (hereunder referred to as a physical address table). When a logical address VA is inputted to the address conversion device 2 in synchronization with the clock PH1, the device 2 compares the inputted logical address VA with a logical addresses stored in each of records respectively corresponding to entries of the logical address table to examine whether or not there is any entry corresponding to a matching logical address. To implement this, the logical address table of the address conversion device 2 is constructed by employing an associative storage 2-2. On the other hand, the physical address table thereof is constructed by employing a static random access memory (RAM) 2-6. Incidentally, the associative storage 2-2 is provided with a hit-signal generating means 2-4 to judge from a result of the comparison made correspondingly to each of the records whether or not there is a hit. The hit-signal generating means 2-4 generates and outputs a hit signal AH indicating that there is a hit in the address conversion device 2.

In case where a hit occurs in the device 2 (namely, the voltage level of the hit signal AH is high), the physical address table of the static RAM 2-6 is accessed in order to output a physical address PA corresponding to the logical address VA. As shown in FIG. 1, the hit-signal generating means 2-4 further generates a control signal PH4, as well as a word selecting signal (hereunder referred to as a word-line signal) RWL on a word line corresponding to the record in which a hit occurs, in order to access the static RAM 2-6. Further, the hit-signal generating means 2-4 generates at least one control signal PH3 in synchronization with the word-line signal RWL and then transfers the generated control signal PH3 to the cache tag memory 4 or the cache memory 6 as a control signal for controlling an operation thereof.

Usually, the address conversion device 2 translates high-order bits of a logical address VA into high-order bits of a physical address PA. Low-order bits of the logical address VA are used as lower-order bits of the physical address PA without being changed. The high-order bits of the physical address PA obtained by the address conversion are transferred to the cache tag memory 4. A number (hereunder referred to as a row address) TRA indicating a row to be selected is predetermined by using the unconverted low-order bits of the logical address VA. Further, a tag address TA is read out of the memory 4 by driving a word line TWL by using the control signal PH3 generated in the address conversion device 2. Then, the thus read tag address TA and the physical address PA obtained by the address conversion are compared with each other in a comparator 4-5.

Similarly, in case of reading data from the cache memory 6, a row address DRA of a row to be selected is predetermined by using unconverted low-order bits of the logical address VA, and then data RD is read therefrom by driving a word line DWL by using the control signal PH3 generated by the address conversion device 2.

Further, if a match is found as a result of the comparison between the tag address TA and the physical address PA, a hit signal CH (hereunder sometimes referred to as a cache hit signal) is generated and is outputted to a tri-state buffer 6-5. Then, data DT stored in a memory cell of the cache memory 6 is transferred therefrom through the tri-state buffer 6-5 to a central processing unit (CPU) and so on.

Figure 2:
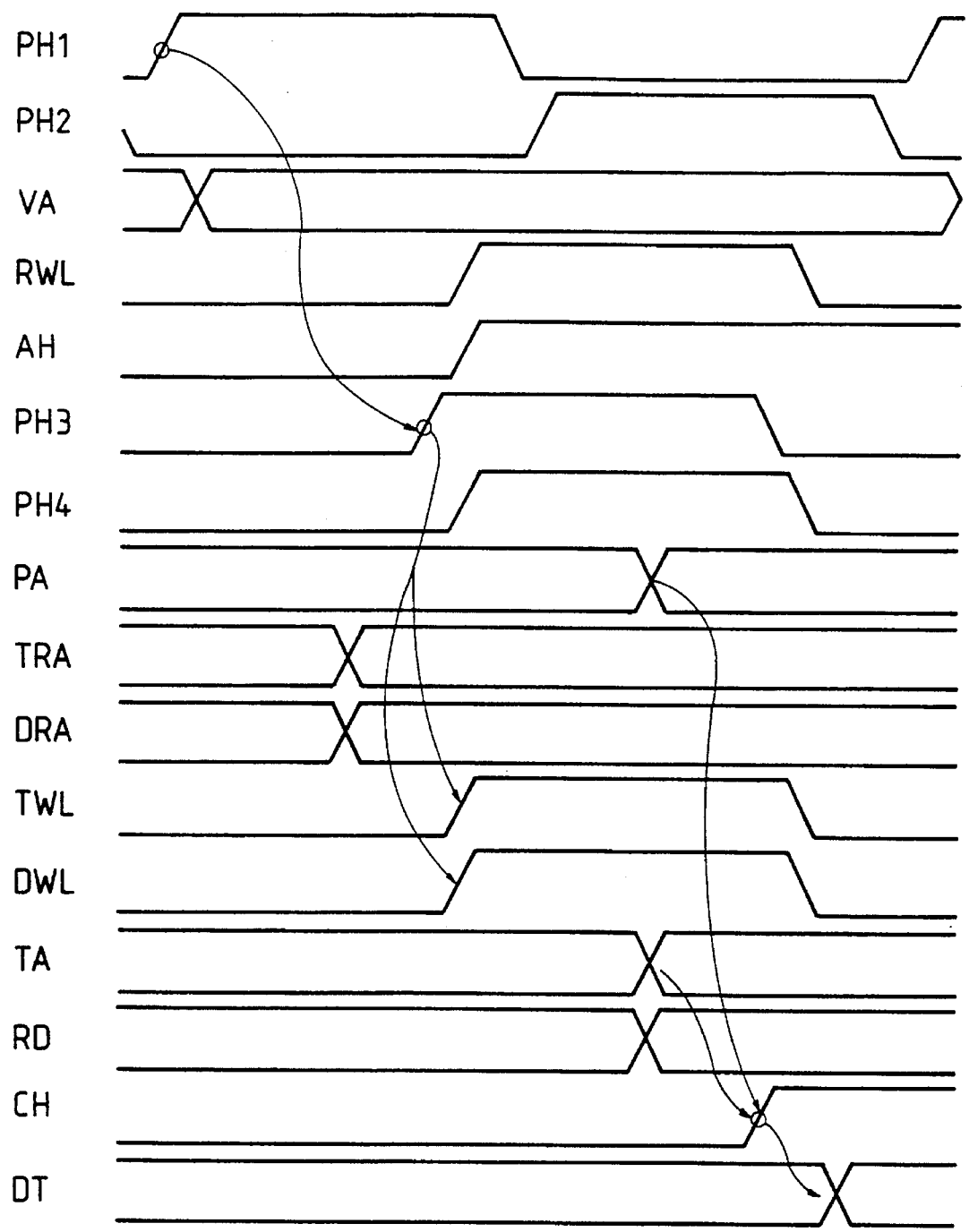
FIG. 2 is a waveform chart for illustrating an operation of the embodiment of FIG. 1.

FIG. 2 is a waveform chart for illustrating an operation of the embodiment of FIG. 1. First, a logic address VA generated in the CPU in synchronization with the clock PH1 is inputted to the address conversion device 2. Then, an address conversion operation is commenced by using a control signal generated by delaying the clock PH1. If a hit occurs in the address conversion device 2, a word-line signal RWL to be used for reading a physical address PA is produced. Simultaneously with this, another control signal PH3 for controlling the cache tag memory 4 and the cache memory 6 is generated on the basis of a hit signal AH indicating that a hit occurs in the address conversion device 2. In the hit-signal generating means 2-4, a control signal PH4 and the word-line signal RWL are generated at substantially the same time at which an entry hit signal AH is generaged therein, and then the static RAM 2-6 is accessed, thereby reading the physical address PA.

On the other hand, in the cache tag memory 4 and the cache memory 6, row addresses TRA and DRA are selected in row decoders 4-1 and 6-1, respectively by using the unconverted low-order bits of the logical address. The row addresses TRA and DRA should be determined by a rise of the voltage level of the control signal PH3 generated in the address conversion device 2. A word line TWL of the cache tag memory 4 and a word line DWL of the cache memory 6 are selected by using the control signal PH3, and thus a tag address TA and cache data DA are respectively read from the cache tag memory 4 and the cache memory 6. The physical address PA is read from the address conversion device 2 at substantially the same time at which the tag address TA and the cache data DA are read. The tag address TA and the physical address PA which are read out at the same time as above described are compared with each other by the comparator 4-5. If matched with each other, a cache hit signal CH is generated. In response to the cache hit signal CH, the cache data RD preliminarily read from a memory cell of the cache memory 6 is transferred to the CPU as data DT. Thereby, the address conversion and an access to the cashe memory by using the physical address obtained by the conversion can be effected in one cycle.

Note that because the the physical address PA obtained by the address conversion and the cache-tag address TA are inputted to the comparator 4-5 at substantially the same time as above described, there can be substantially no time between the arrival of one of the addresses PA and TA at the comparator 4-5 and that of the other thereat, and consequently a microprocessor having the cache can perform data processing at a high speed.

Figure 3A:
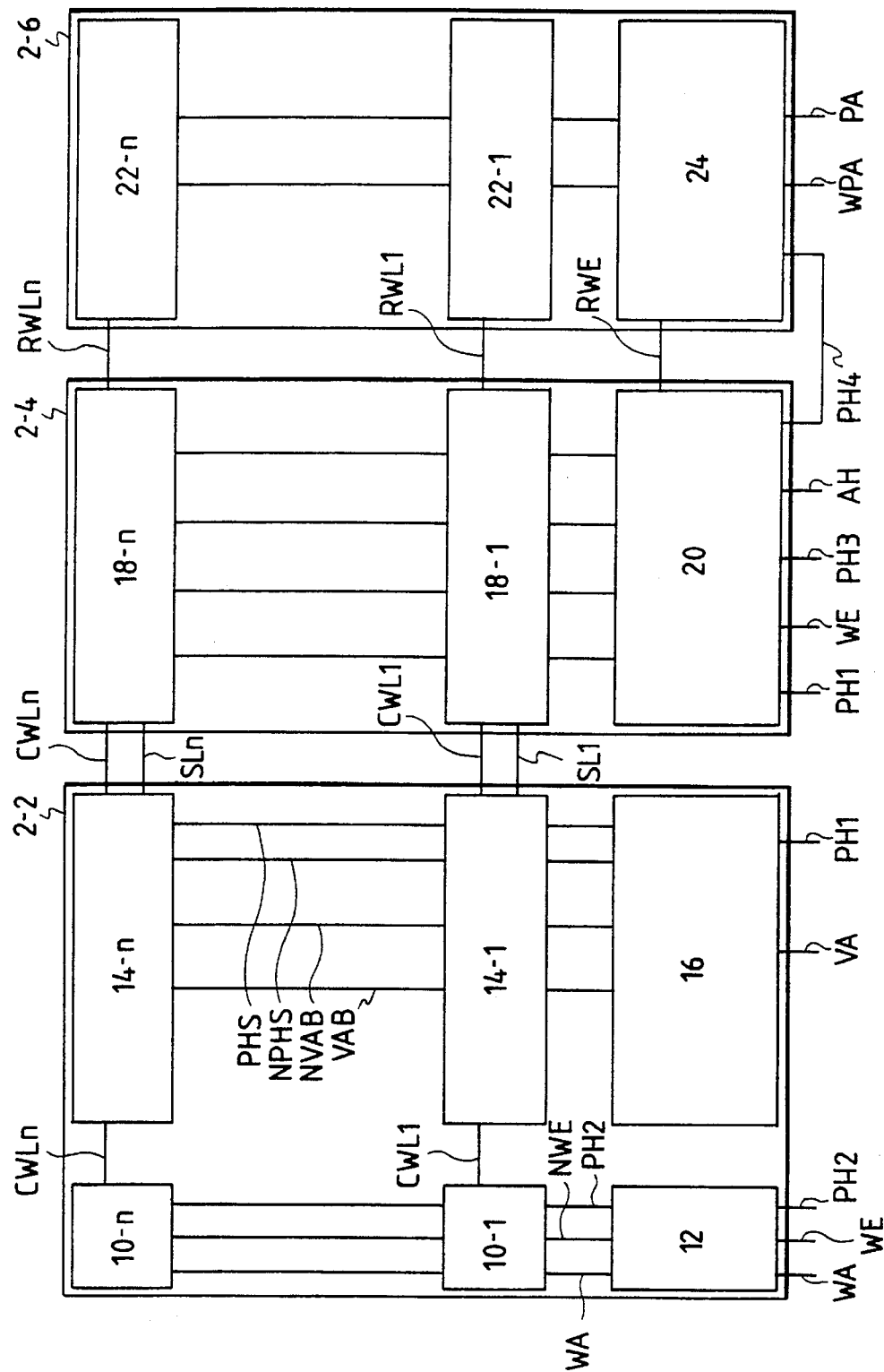
FIG. 3(a) is a schematic block diagram for showing the construction of an address conversion device according to the present invention.

FIG. 3(a) is a schematic block diagram for showing the construction of a practical example of the address conversion device according to the present invention. In this figure, reference characters 2-2, 2-4 and 2-6 denote an associative storage, a hit-signal generating means and a static RAM, respectively.

The associative storage 2-2 is comprised of a decoder 10-1, a buffer 12, an associative storage-cell array 14-1 and another buffer 16. The hit-signal generating means 2-4 is made up of a circuit for generating an entry hit signal and a word-line signal 18-i and a control signal generating circuit 20. The static RAM 2-6 is composed of a memory-cell array 22-i ($1 \leq i \leq n$ (n is a positive integer) and a read/write device 24.

First, a write operation of the address conversion device will be described hereinafter. A write-operation control signal WE, a signal representing a logical address VA and a write address signal indicating a write address (namely, a cell) WA to which a logical or physical address is written are inputted to the associative storage 2-2 in synchronization with a clock PH1. The logical address VA is written to a storage-cell, which is selected by the decoder 10-i by using the write address WA, of the associative storage-cell array 14-i, which is selected by a word-line signal indicating a word line CWLi of the associative storage 2-2, in synchronization with a clock PH2. In the static RAM 2-6, a physical address WPA is likewise written to a memory-cell 22-i selected by using a word-line signal indicating a word line RWLi corresponding to the same address VA in synchronization with the clock PH2.

Next, an address-conversion operation of the address conversion device 2 will be described hereinbelow. In the address-conversion operation, the logical address VA is inputted to the associative storage 2-2 in synchronization with the clock PH1. The hit-signal generating means 2-4 generates a control signal PH4 for reading a physical address PA and another control signal PH3 for controlling accesses to the cache tag memory 4 and the cache memory 6. Further, if a hit occurs in the address conversion device, the hit-signal generating means 2-4 produces a hit signal AH (namely, the voltage level of the hit signal AH is high). However, in case that no hit occurs therein (thus, the voltage level of the hit signal AH is low), an exceptional treatment is started, and data on an entry necessary for performing the address conversion is fetched, and then unnecessary data is replaced with the fetched data on the necessary entry by performing the above-mentioned write operation. Thereafter, the address conversion is effected once again.

Figure 3B:
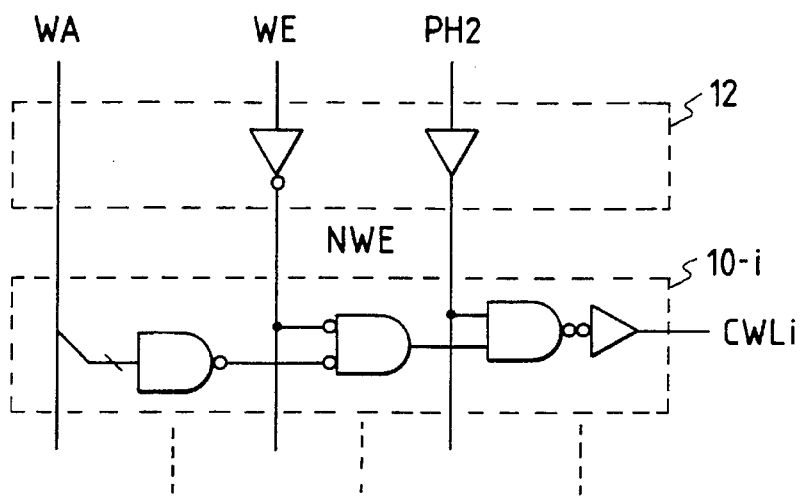
FIG. 3(b) is a circuit diagram for showing the practical construction of a decoder portion of an associative storage provided in the address conversion device of FIG. 3(a)

In the foregoing description, operations of the address conversion device are outlined. Hereinafter, operations of the circuits composing the address conversion device will be described by referring to figures showing the construction practical examples of the composing circuits. FIG. 3(b) is a circuit diagram for showing the practical construction of a decoder portion of the associative storage 2-2 employed in the address conversion device 2 of FIG. 3(a). In FIG. 3(b), reference characters 10-i and 12 designate a decoder for decoding address data corresponding to one of the entries and a buffer for storing control signals used to control the decoder, respectively. The decoder 10-i is used only in the write operation during which the voltage level of the write-operation control signal WE is high. A storage-cell corresponding to an entry is selected by the decoder 10-i by performing a decoding process by using the write address WA. A word-line signal CWLi is generated in synchronization with the leading edge of a control signal PH2 on condition that the voltage level of the write-operation control signal WE is high. Incidentally, the voltage level of the word-line signal CWLi is always low when that of the signal WE is low.

Figure 3C:
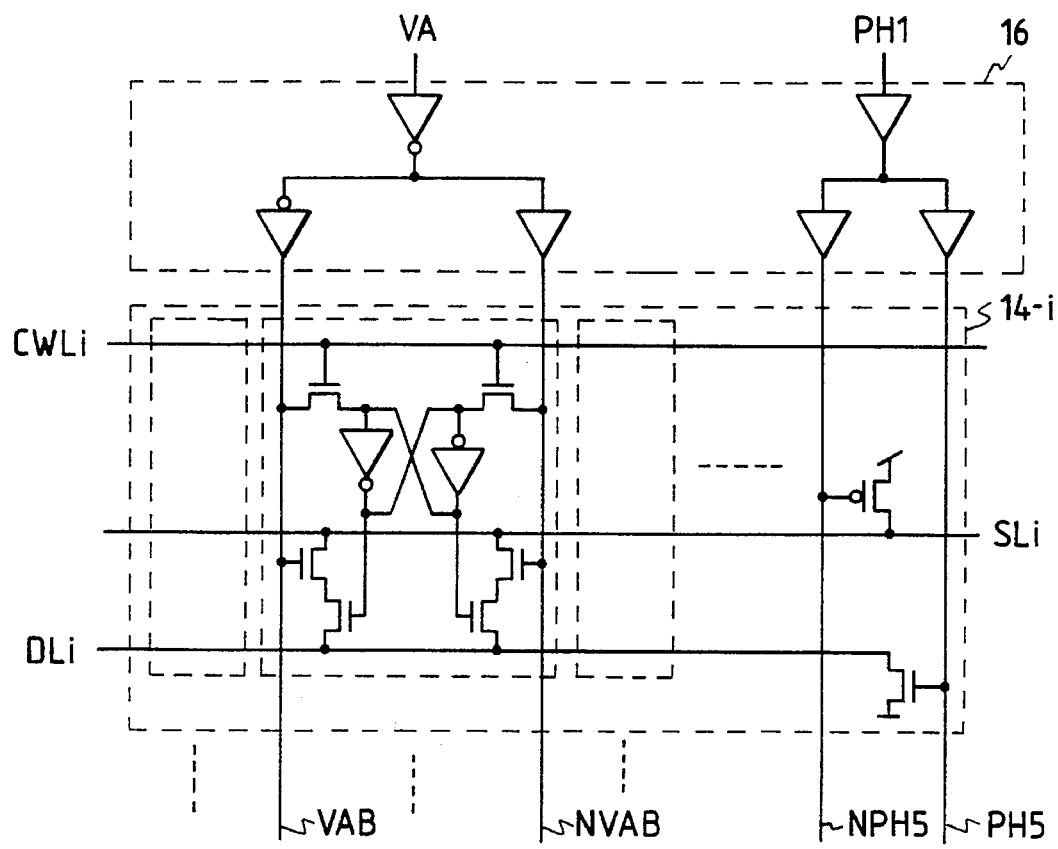
FIG. 3(c) is a circuit diagram for showing the practical construction of an associative storage-cell portion of the associative storage employed in the address conversion device of FIG. 3(a)

FIG. 3(c) is a circuit diagram for showing the practical construction of an associative storage-cell portion of the associative storage 2-2 employed in the address conversion device 2 of FIG. 3(a). In FIG. 3(c), reference characters 14-i and 16 denote an associative storage-cell array for storing address data corresponding to one of the entries and a buffer to be used for performing an operation of comparing input logical address with address data stored in a record corresponding to an entry of the logical address table and an operation of writing address data to a record corresponding to an entry of the logical address table, respectively.

In the buffer 16, signals VAB and NVAB are generated from the logical address VA, respectively in the comparison and write operations. In case where the voltage level of the word-line signal CWLi transmitted on the corresponding word line of the associative storage-cell array 14-i is high, the write operation is performed. In contrast, in case where the voltage level of the word-line signal CWLi is low, the comparison operation is carried out. A sense signal SLi transmitted a corresponding sense line is used to compare each bit of address data stored in a storage-cell of the associative storage-cell array 14-i with a corresponding bit of the logical address VA. In case that all bits of the address data corresponding to an entry are matched with all bits of the logical address VA, respectively, the voltage level of the sense signal SLi remains high. Namely, the corresponding sense line remains precharging. In case where any bit of the address data corresponding to the entry are matched, a discharging line DLi of the associative storage-cell corresponding to the address data which does not match with the logical address VA conducts. Thus, the voltage level of the sense signal SLi changes from a high level to a low one. Usually, one cycle is divided on the basis of clocks PH5 and NPH5 into a comparison operation period when the voltage level of the clock PH5 is high and into a precharging operation period when the voltage level of the clock NPH5 is low. The clocks PH5 and NPH5 are generated in the buffer 16 by delaying the clock PH1.

Figure 3D:
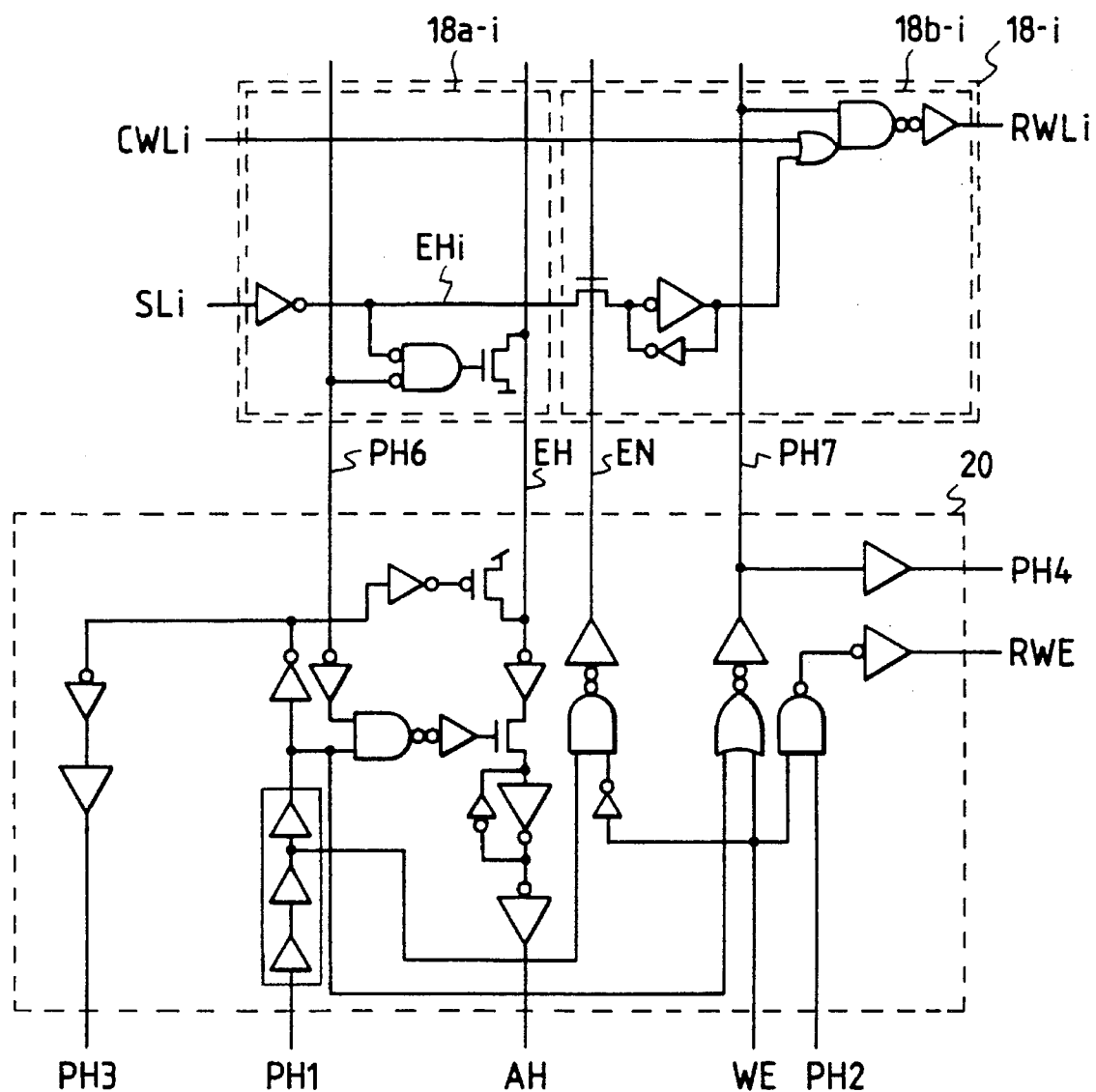
FIG. 3(d) is a circuit diagram for showing the practical construction of a hit-signal generating means provided in the address conversion device of FIG. 3(a)

FIG. 3(d) is a circuit diagram for showing the practical construction of a hit-signal generating means 2-4 employed in the address conversion device 2 of FIG. 3(a). As shown in this figure, the hit-signal generating means 2-4 is comprised of a circuit 18a-i for generating a hit signal AH corresponding to an entry of the logical table when an address conversion is performed, a circuit 18b-i for generating a word-line signal to be used for reading a physical address and a control signal circuit 20 for generating the control signal PH3 and control signals PH6 and PH7 to be used to control the circuits 18a-i and 18b-i. The control signal generating circuit 20 generates the clock PH6 to examine whether or not a hit occurs in any of records corresponding to entries, thereby controlling a precharging and discharging operations of an entry-hit-signal line. In case that a hit occurs in one of the records, the voltage level of an entry hit signal transmitted on an entry-hit-signal line EHi is low. When the hit occurs in one of the records and the voltage level of the clock PH6 is low, the voltage level of the entry hit signal also drops into a low level. Thereby, the voltage level of the hit signal AH becomes high.

Further, in the control signal generating circuit 20, the clocks PH4 and PH7 are generated to read a physical address from the physical address table when a hit occurs in the address conversion. The clock PH4 is used to control a precharging operation of a bit line of the static RAM 2-6, and the clock PH7 is used to control the word line RWLi thereof. The clocks PH4 and PH7 are generated by delaying the clock PH1, and an amount of the delay of the clock PH1 can be about as much as an amount of a delay of the entry hit signal EHi. Thereby, the voltage level of the word-line signal RWLi can be risen immediately after the entry hit signal EHi is generated.

On the other hand, in the write operation, the voltage level of the write-operation control signal WE becomes high, the voltage level of the word-line signal RWLi can be risen when that of the word-line signal CWLi rises. Further, in response to the signal WE and the clock PH2, a control signal RWE for transferring data, which should be written, to the bit line is generated.

Figure 3E:
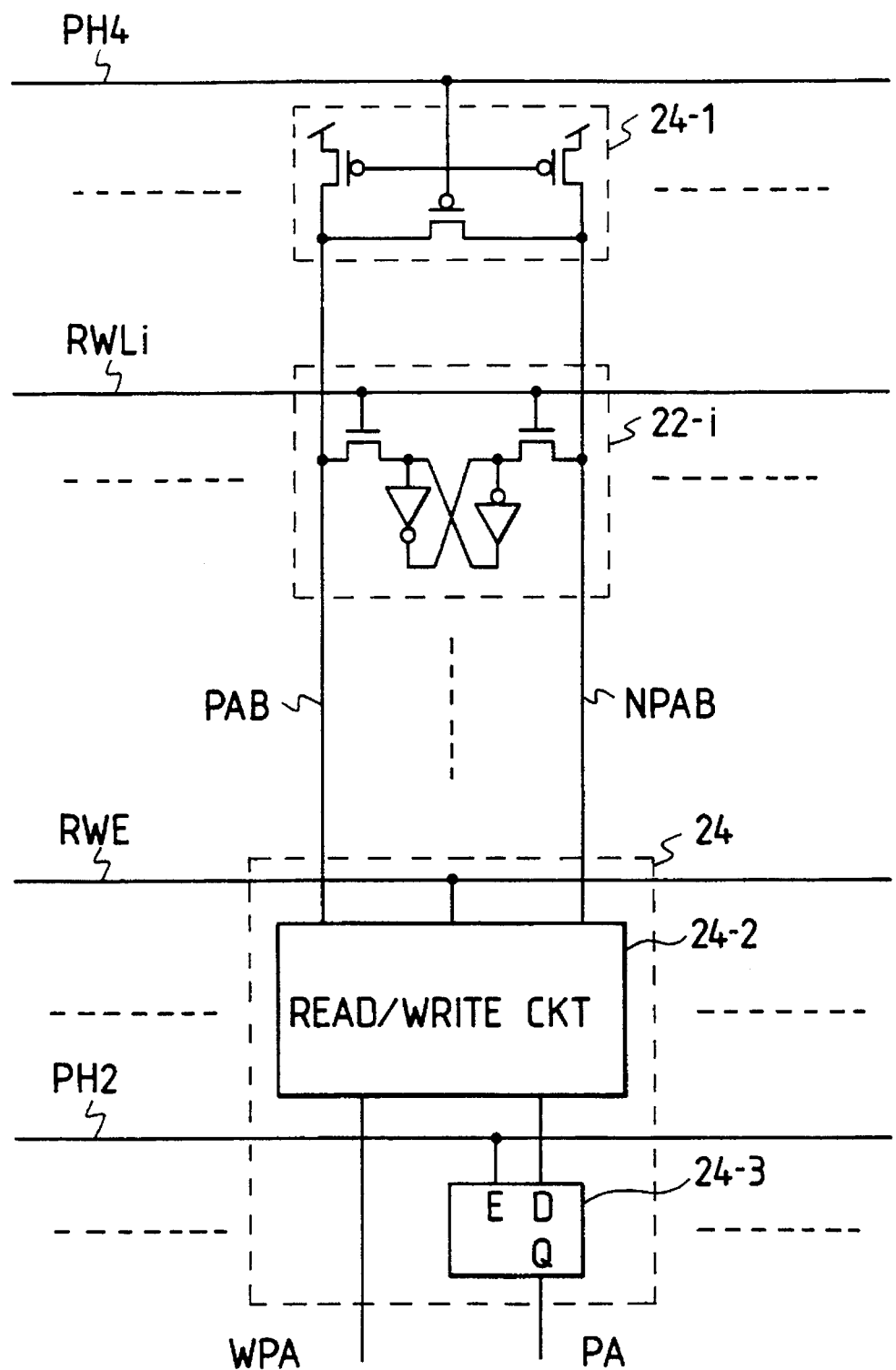
FIG. 3(e) is a circuit diagram for showing the construction of a practical example of the static RAM composing the physical address table.

FIG. 3(e) is a circuit diagram for showing the construction of a practical example of the static RAM composing the physical address table. In this figure, reference characters 22-i and 24 denote a memory cell array and a read/write device having a circuit 24-1 for precharging a bit line, a read/write circuit 24-2 and an output latch 24-3, respectively.

In the write operation, the physical address WPA to be written is transferred to the bit lines PAB and NPAB through the write circuit 24-2 in accordance with the control signal RWE. On the other hand, the voltage level of the word-line signal RWLi rises in synchronization with the clock PH2, and the data transferred to the bit lines PAB and NPAB are written to the memory cell 22-i. In the read operation, the bit lines PAB and NPAB fall into a precharging state when the voltage level of the control signal PH4 is low. When the voltage levels of the control signal PH4 and the word-line signal RWLi rise, the data stored in the memory cell 22-i is transferred through the bit lines PAB and NPAB to the read circuit 24-2 and is further fetched by the output latch 24-3 in response to the clock PH2. Moreover, an output of the latch 24-3 is transferred to the comparator 4-5 of the cache tag memory 4 as the physical address PA obtained by the conversion. Note that FIG. 3 only shows an example of the address conversion device, that there are other circuits capable of carrying out equivalent functions and that the present invention is not limited to the example of FIG. 3.

Figure 4:
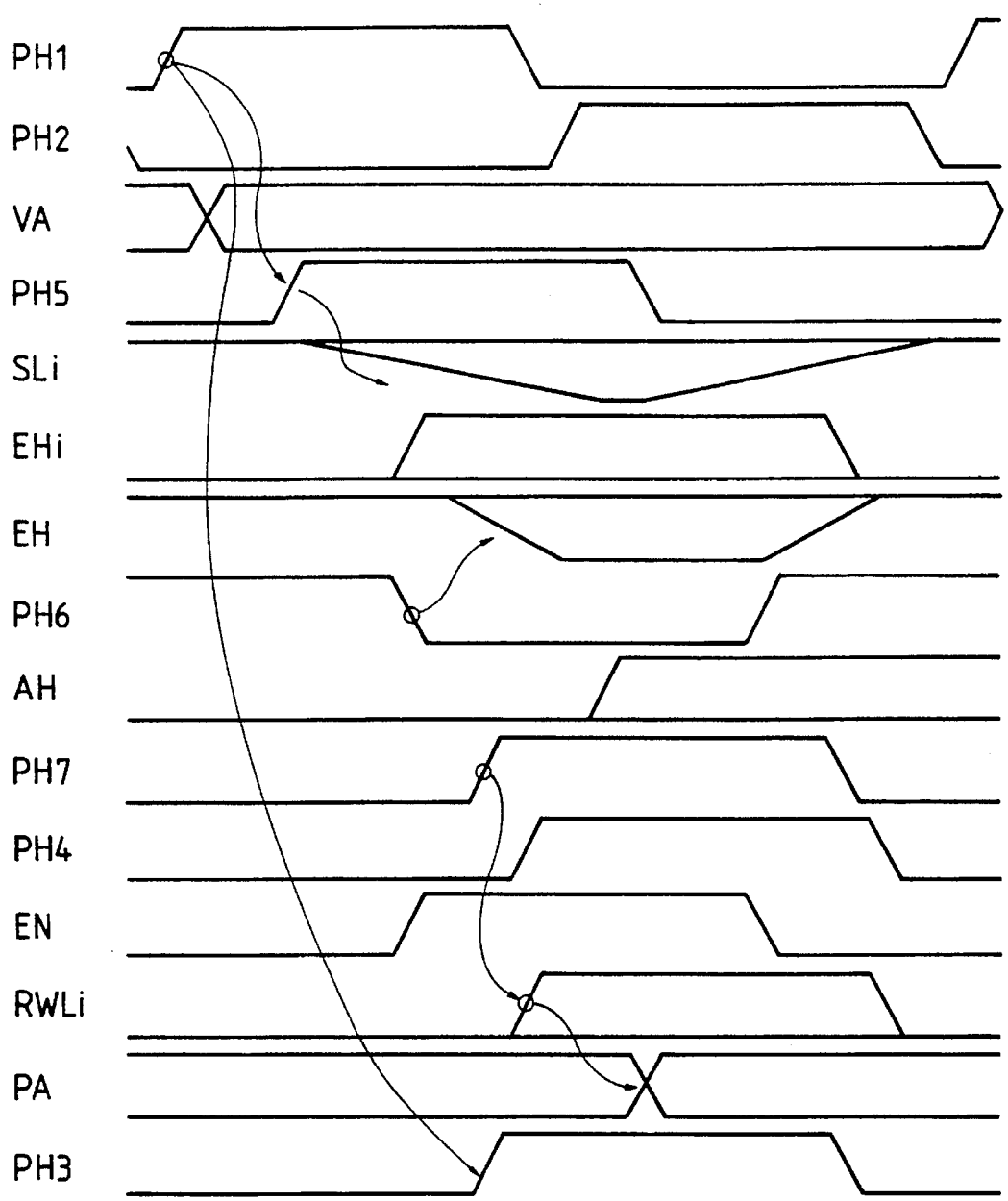
FIG. 4 is a waveform chart for illustrating principal signals used in an address conversion operation of the address conversion device of FIG. 3(a)

FIG. 4 is a waveform chart for illustrating principal signals used in the address conversion operation of the address conversion device of FIG. 3. The logical address VA is inputted thereto in synchronization with the clock PH1. The comparison operation is performed in the associative storage-cell array 14-i in response to the control signal PH5. Further, in response to this, the state of a sense-line signal SLi changes. Then, the entry hit signal EH indicating whether or not a hit occurs in the address conversion device is outputted by using the sense-line signal SLi and the control signal PH6. The control signal generating circuit 20 latches the entry hit signal EH and then generates the hit signal AH. Further, in case where a hit occurs, an entry corresponding to a record in which the hit occurs is stored by using the signal EN and the control signals PH4 and PH7 and the word-line signal PWLi are generated to access the static RAM. Thereby, the physical address PA is read out.

Furthermore, the control signal PH3 is generated such that the cache tag address (hereunder sometimes referred to as the tag address) TA and the physical address PA can be read at substantially the same time.

Figure 5:
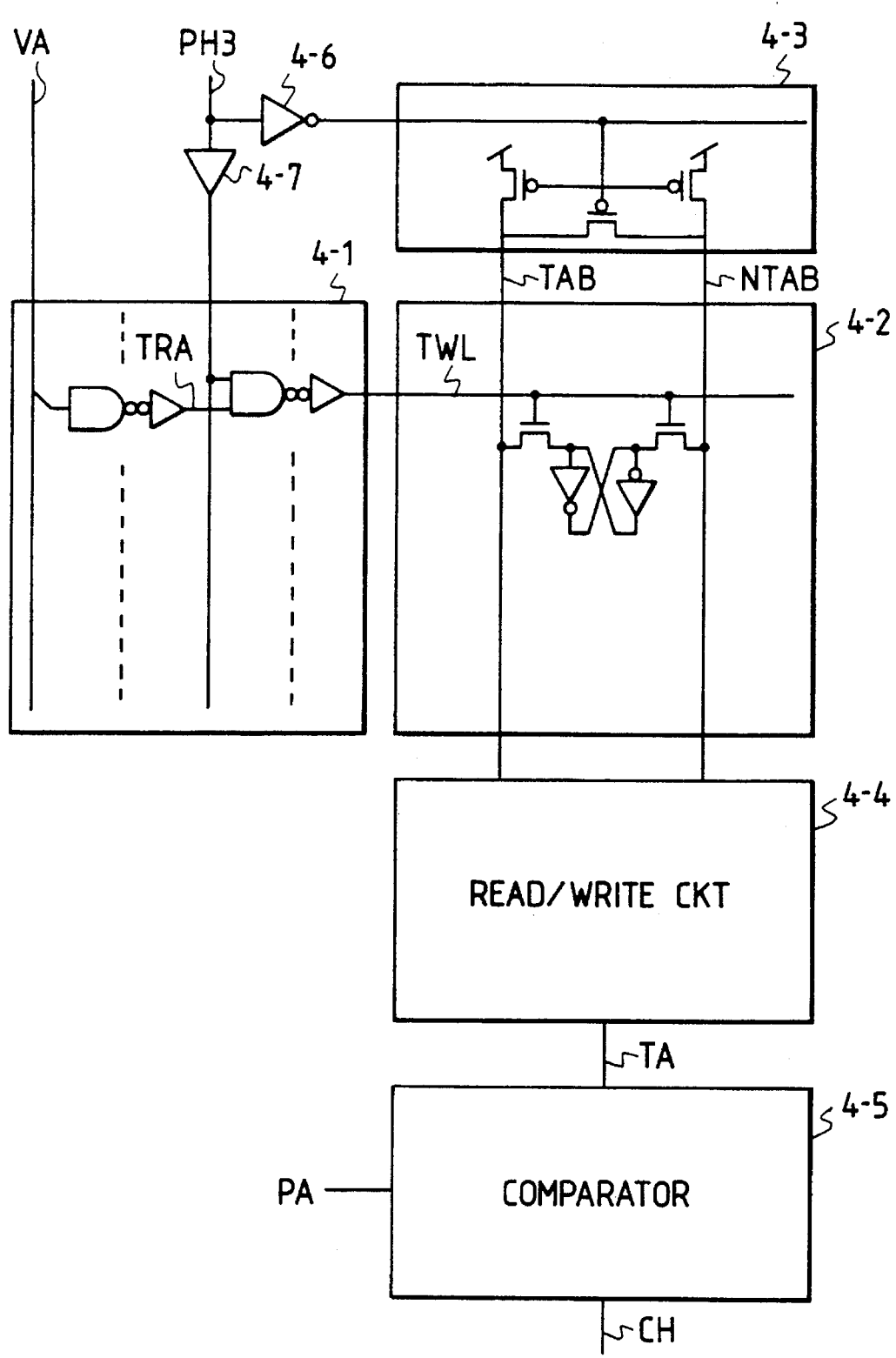
FIG. 5 is a schematic block diagram for showing the construction of a practical example of a cache tag memory of FIG. 1.

FIG. 5 is a schematic block diagram for showing the construction of a practical example of the cache tag memory 4. Usually, the cache-tag memory 4 is composed of a static RAM and a comparator. In FIG. 5, reference numeral 4-1 represents a row decoder; 4-2 a memory-cell array; 4-3 a precharging circuit for precharging of bit lines B and NB; 4-4 a read/write circuit; 4-5 a comparator for comparing the tag address TA with the physical address PA; 4-6 an inverter buffer; and 4-7 a buffer.

The control signal PH3 generated in the address conversion device is inverted by the inverter buffer 4-6 and then is inputted to the precharging circuit 4-3 to be used as a precharging signal for the precharging of the bit lines B and NB. On the other hand, the control signal PH3 is also inputted to the row decoder 4-1 through the buffer 4-7 so as to be used as a control signal for driving the word line TWL corresponding to the row address TRA selected by using the unconverted low-order bits of the logical address VA.

Thereby, the reading of the tag address TA and the generation of the physical address in the address conversion circuit are effected at substantially the same time. Subsequently, the tag address is compared with the physical address PA in the comparator 4-5 to judge whether or not a hit occurs in the cache tag memory 4. If there occurs a hit, a cache hit signal CH is generated and is then transferred to the cache memory 6.

At that time, the tag address TA and the physical address PA are transferred to the comparator 4-5 at substantially the same time. Thus, there can be substantially no wait time required for waiting an arrival of one of the addresses TA and PA, which should be compared with each other, after the other of the addresses reaches the comparator. Consequently, the cache hit signal CH can be very quickly obtained.

Figure 6:
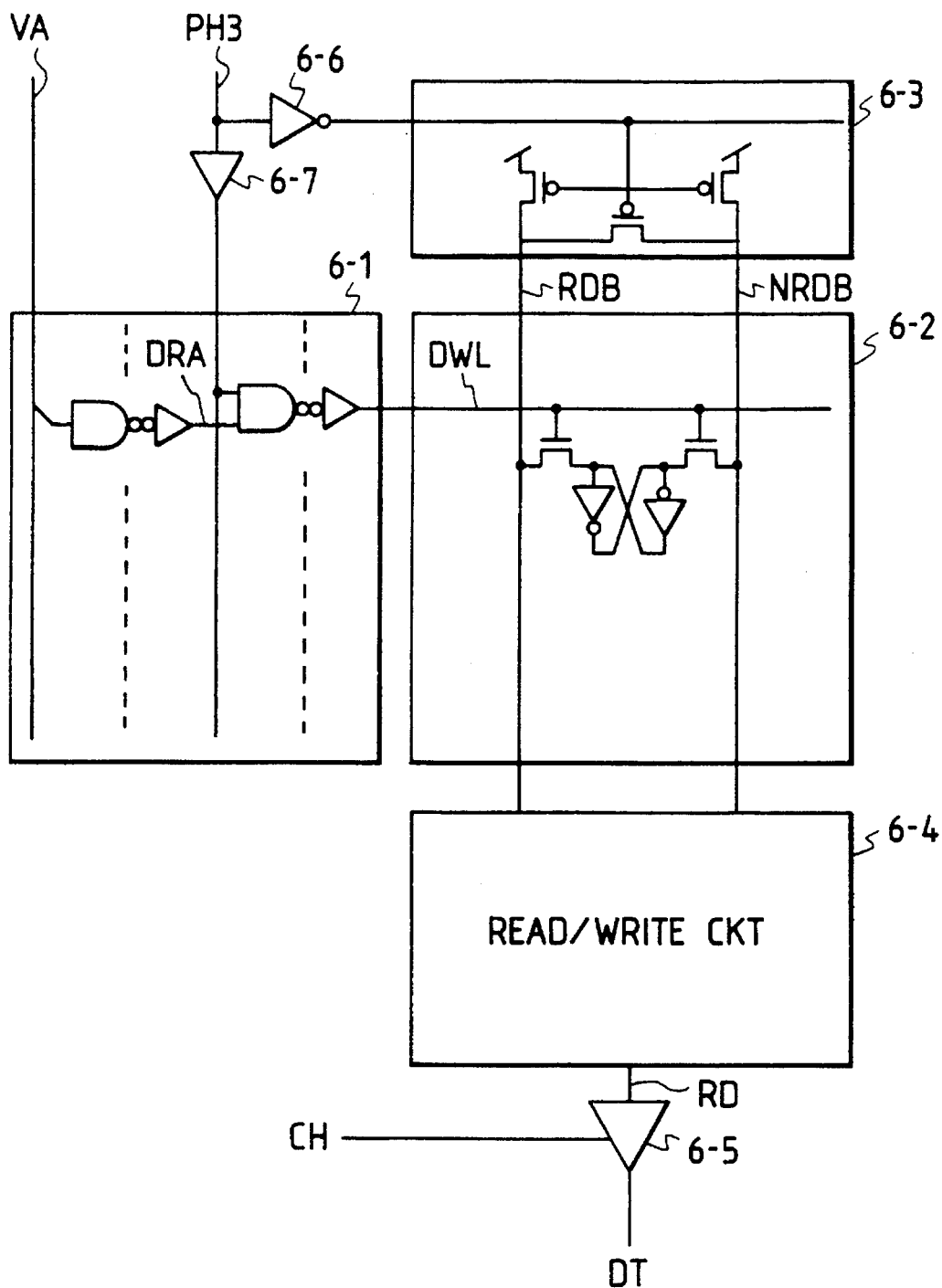
FIG. 6 is a schematic block diagram for showing the construction of a practical example of a cache memory of FIG. 1.

FIG. 6 is a schematic block diagram for showing the construction of a practical example of the cache memory 6. Usually, the cache memory 6 is comprised of a static RAM and a tri-state buffer. In FIG. 6, reference numeral 6-1 represents a row decoder; 6-2 a memory-cell array; 6-3 a precharging circuit for precharging of bit lines B and NB; 6-4 a read/write circuit; 6-5 a tri-state buffer; 6-6 an inverter buffer; and 6-7 a buffer.

The control signal PH3 generated in the address conversion device 2 is inverted by the inverter buffer 6-6 and is subsequently inputted to the precharging circuit 6-3 to be used as precharging signals for the precharging of the bit lines B and NB. On the other hand, the control signal PH3 is also inputted to the row decoder through the buffer 6-7 wherein the inputted signal PH3 is used as a control signal for driving the word line DWL corresponding to the DRA selected according to the unconverted low-order bits of the logical address VA. When a hit occurs in the cache tag memory 4, the cache hit signal CH is generated to enable the tri-state buffer 6-5. Thus, cache data DT stored in the cache memory 6 is outputted therefrom.

In the foregoing description, the operations of accessing the cache tag memory and the cache memory by using the same control signal PH3 have been explained. It is, however, apparent that equivalent effects can be obtained without using the same control signal if it is possible to simultaneously perform the reading of the physical address PA by the address conversion and that of the tag address TA from the cache tag memory 4.

In case of the above described embodiment of the present invention, it is intended that when an access time tM for the cache memory is longer than a sum of an access time tT for the cache tag memory and a period of time tC required to compare a tag address with a physical address (namely, tT+tC<tM), an operation of accessing the cache memory is started by generating the control signals by using the address conversion device earlier than an access to the cache tag memory by a period of time of (tM−tT−tC). Therefore, in case where the access time tM for the cache memory is longer than a sum of an access time tT for the cache tag memory and a period of time tC required to compare a tag address with a physical address, it is necessary to generate the control signal PH3⁻ for the cache memory (to be described later) earlier than the production of the control signal PH3 for the cache tag memory such that data stored in the cache memory can be read therefrom at the time when the cache hit signal CH is generated.

Figure 7A:
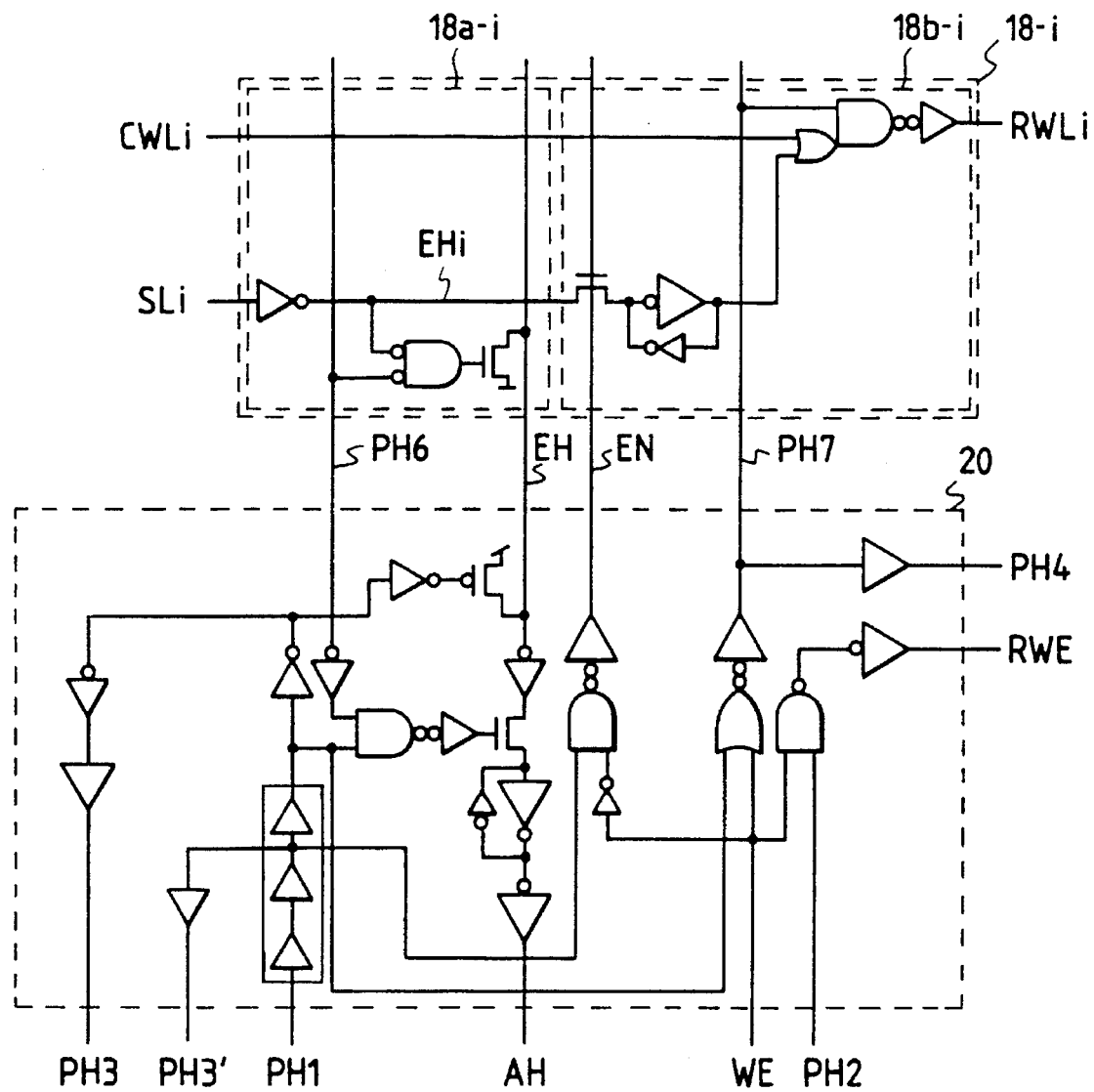
FIG. 7(a) is a circuit diagram for showing the construction of a practical example of a hit-signal generating means employed in the address conversion device of FIG. 3(a) in case where an access time tM for the cache memory is longer than a sum of an access time tT for the cache tag memory and a period of time tC required to compare a tag address with a physical address.

FIG. 7(a) is a circuit diagram for showing the construction of a practical example of the hit-signal generating means 2-4 employed in the address conversion device of FIG. 3(a) in case where an access time tM for the cache memory is longer than a sum of an access time tT for the cache tag memory and a period of time tC required to compare a tag address with a physical address (namely, tT+tC<tM). This hit-signal generating means 2-4 generates the access controlling signal PH3⁻ for the cache memory earlier than the production of the control signal PH3 for the cache tag memory by a period of time of (tM−tT−tC).

Figure 7B:
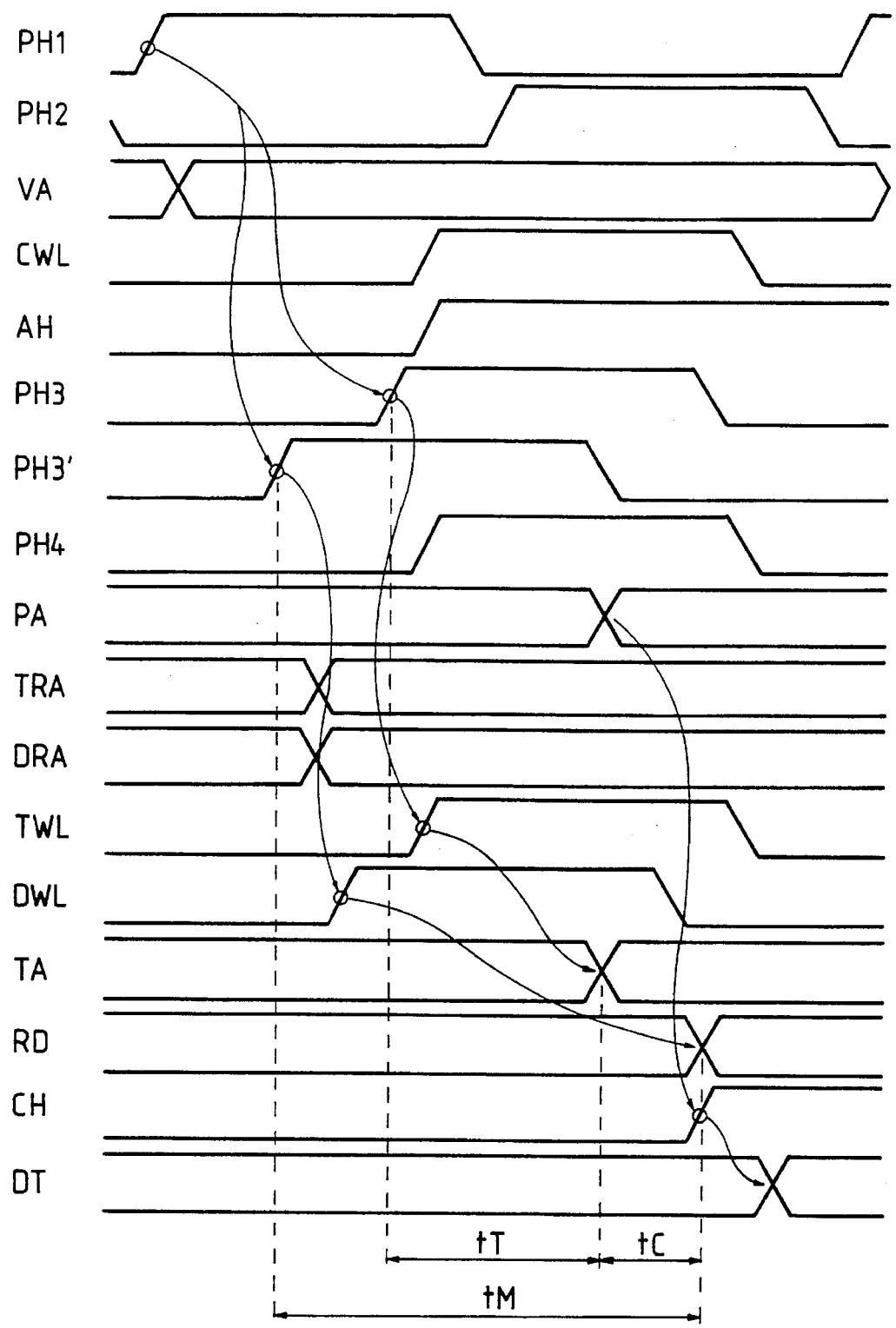
FIG. 7(b) is a waveform chart for illustrating operations of primary portions of the embodiment employing the hit-signal generating means of FIG. 7(a).

FIG. 7(b) is a waveform chart for illustrating operations of primary portions of the embodiment employing the hit-signal generating means of FIG. 7(a). The control signal PH3 for the cache tag memory and the access control signal PH3⁻ for the cache memory are generated in such a manner to be behind the rise of the clock signal PH1. In the cache tag memory, the tag address TA is generated in response to the control signal PH3. The thus generated tag address TA is compared with the physical address PA by the comparator, and consequently the cache hit signal CH is produced. Note that a period of time from the rise of the control signal PH3 to the output of the tag address TA is equal to tT and that a period of time from the output of the tag address TA to the rise of the cache hit signal CH is equal to tC. On the other hand, from the cache memory, the cache data RD is read in response to the control signal PH3⁻. Note that a period of time from the rise of the control signal PH3⁻ to the output of the cache data RD is equal to tM. Although the access time tM for the cache memory is thus longer than the sum of the access time tT for the cache tag memory and a period of time tC required to compare a tag address with a physical address (namely, tT+tC<tM), the access controlling signal PH3⁻ for the cache memory is generated earlier than the production of the control signal PH3 for the cache tag memory by a period of time of (tM−tT−tC). As a result, the cache data RD and the cache hit signal CH are simultaneously outputted.

In contrast, in case where the access time tM for the cache memory is shorter than the sum of the access time tT for the cache tag memory and a period of time tC required to compare a tag address with a physical address (namely, tT+tC>tM), the control signals are generated in the address conversion device of the present invention in such a manner that a period of time tA required for an address conversion is equal to the access time for the cache tag memory. Namely, in this case, the same control signal PH3 can be used to control accesses to the cache tag memory and to the cache memory. Thus, in case where the access time tM for the cache memory is shorter than the sum of the access time tT for the cache tag memory and a period of time tC required to compare a tag address with a physical address (namely, tT+tC>tM), the access control signal for the cache tag memory is produced in the address conversion device at the time when the entry hit signal is generated in the address conversion device.

Further, in the foregoing description, has been explained the operation of the above described embodiment in case that the access signals for the cache tag memory and for the cache memory are generated by delaying the control signal (i.e., the clock) for producing the hit signals in the address conversion device. It is apparent that equivalent effects can be obtained even in case that the access control signals are generated by delaying the various control signals (e.g., the hit signal) used in the address conversion device. In any case, the generation of a physical address and the reading of a tag address are simultaneously performed, and a wait time required for waiting the arrival of one of the physical and tag addresses to a comparator after the other reaches there is eliminated, and cache data stored in the cache memory is transferred in response to the generation of the cache hit signal.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. An address conversion device operating on a clock signal for controlling a cache tag memory and a cache memory, comprising:

first storage means for storing a logical address table, said first storage means comparing an input logical address with logical addresses in the logical address table, and outputting a sense signal which indicates that the input logical address is identical with one of the logical addresses;

second storage means for storing a physical address table; and control signal generating means for outputting a first control signal to control the cache tag memory, and outputting a second control signal to control the second storage means in response to the sense signal, the first control signal and the second control signal being outputted within one cycle of the clock signal, wherein a tag address in the cache tag memory corresponding to the input logical address and a physical address in the second storage means corresponding to the input logical address are substantially simultaneously outputted within the same one cycle of the clock signal in response to the first control signal and the second control signal, respectively, the cache tag memory outputs a hit signal enabling the cache memory to output a read data stored in the cache memory corresponding to the input logical addresses within the same one cycle of the clock signal when detecting that the tag address is identical with the physical address, and the cache memory outputs the read data within the same one cycle of the clock signal when receiving the hit signal.

2. The control system of claim 1, wherein the word selecting signal and the control signal of the control signal generating means are generated by delaying a clock signal.

3. The control system of claim 1, wherein the associative storage means generates an entry hit signal if a hit occurs in a record corresponding to an entry of a logical address table stored therein as a result of the comparison of the input logical address with a logical address stored in the record, and the word selecting signal and the control signal are generated by the control signal generating means in response to the entry hit signal.

4. An address conversion device operating on a clock signal for controlling a cache tag memory and a cache memory, comprising:

first storage means for storing a logical address table, said first storage means comparing an input logical address with logical addresses in the logical address table, and outputting a sense signal which indicates that the input logical address is identical with one of the logical addresses;

second storage means for storing a physical address table; and control signal generating means for outputting a first control signal to control the cache tag memory, said control signal generating means outputting a second control signal to control the second storage means in response to the sense signal, and outputting a third control signal to control the cache memory, the first control signal, the second control signal, and the third control signal being outputted within one cycle of the clock signal, wherein a tag address in the cache tag memory corresponding to the input logical address and a physical address in the second storage means corresponding to the input logical address are substantially simultaneously outputted and a read data in the cache memory corresponding to the input logical address is set within the same one cycle of the clock signal in response to the first control signal, the second control signal, and the third control signal, respectively, the cache tag memory outputs a hit signal enabling the cache memory to output the read data stored in the cache memory corresponding to the input logical address within the same one cycle of the clock signal when detecting that the tag address is identical with the physical address, and the cache memory outputs the read data within the same one cycle of the clock signal when receiving the hit signal.

5. The control system of claim 4, wherein the word selecting signal and the first and second control signals of the control signal generating means are generated by delaying a clock signal.

6. The control system of claim 4, wherein the associative storage means generates an entry hit signal if a hit occurs in a record corresponding to an entry of a logical address table stored therein as a result of the comparison of the input logical address with a logical address stored in the record, and wherein the word selecting signal and the first and second control signals are generated by the control signal generating means in response to the entry hit signal.

7. The control system of claim 4, wherein the first and second control signals are identical with each other.

* * * * *